United States Patent [19]

Hiyama et al.

[11] Patent Number: 4,829,749
[45] Date of Patent: May 16, 1989

[54] TIRE HANDLING SYSTEM

[75] Inventors: Hisato Hiyama, Iruma; Yukiyasu Joe, Kodaira; Shunro Kubota; Toshihiko Tanaka, both of Funabashi; Takuichi Kameda, Iruma, all of Japan

[73] Assignees: Sumitomo Heavy Industries, Ltd.; Bridgestone, Corp., both of Tokyo, Japan

[21] Appl. No.: 947,460

[22] Filed: Dec. 29, 1986

[30] Foreign Application Priority Data

Dec. 28, 1985 [JP] Japan .................. 60-299068
Dec. 28, 1985 [JP] Japan .................. 60-299069
Dec. 28, 1985 [JP] Japan .................. 60-299070

[51] Int. Cl.⁴ .................. B65B 25/24; B65B 35/50; B65B 35/58
[52] U.S. Cl. .................. 53/538; 53/247; 53/252; 53/539; 193/35 G; 414/766; 414/767; 414/773
[58] Field of Search .................. 198/419; 193/35 G; 53/250, 252, 247, 525, 539, 538, 499, 500; 414/535, 765, 784, 766, 767, 773

[56] References Cited

U.S. PATENT DOCUMENTS

| 2,941,339 | 6/1960 | Salwasser | 53/247 X |
| 3,390,789 | 7/1968 | Hill et al. | 414/784 |
| 3,566,579 | 3/1971 | Russell | 53/525 X |
| 3,729,895 | 5/1973 | Kramer et al. | 414/54 X |
| 4,354,786 | 10/1982 | Spitler | 414/46 |
| 4,354,788 | 10/1982 | Giusti | 414/766 X |
| 4,573,859 | 3/1986 | Amano et al. | 414/222 X |
| 4,627,526 | 12/1986 | Masciarelli | 198/463.4 X |

FOREIGN PATENT DOCUMENTS

| 0077304 | 4/1983 | European Pat. Off. |
| 301449 | 9/1972 | Fed. Rep. of Germany |
| 60-132837 | 7/1985 | Japan |
| 60-132839 | 7/1985 | Japan |
| 60-132834 | 7/1985 | Japan |
| 60-132825 | 7/1985 | Japan |
| 839920 | 6/1981 | U.S.S.R. | 198/463.6 |

Primary Examiner—Frank E. Werner
Assistant Examiner—Janice Krizek
Attorney, Agent, or Firm—Armstrong, Nikaido, Marmelstein, Kubovcik & Murray

[57] ABSTRACT

A tire handling system capable of automatically performing a series of tire handling operations including sorting of the tires from a production/inspection line according to types and sizes, stacking the sorted tires, and shelving the stacks of tires in frame pallets. The tire handling system incorporates a novel tire supplying device which supplies the sorted tire to the tire stacking device in one-by-one fashion, a tire inverting device disposed between the tire supplying device and the tire stacking device and adapted for selectively inverting tires conveyed along the sorting line, and an automatic tire shelving device for shelving the stacks of tires. These devices have simple constructions but yet are capable of performing the supplying, inverting and shelving operations with a high degree of reliability.

8 Claims, 9 Drawing Sheets

TIRE HANDLING SYSTEM

BACKGROUND OF THE INVENTION

1. Field of the Invention

The present invention relates to a tire handling system which is adapted to automatically perform a series of operations including sorting of tires conveyed from a production or inspection line according to types or sizes of the tires by means of a sorting device, stacking of the sorted tires by means of a stacking device, and shelving of the stacks of tires in frame pallets.

More particularly, the invention is concerned with an automatic tire supplying device adapted for supplying the stacking device of the handling system with the tires sorted by the sorting device incorporated in the same system, and a tire shelving device which can automatically shelve the stacks of the tires.

The invention is also concerned with an automatic tire inverting device incorporated in the tire handling system and capable of inverting the tires which are to be delivered to the stacking device.

2. Description of the Prior Art

Hitherto, the supply of tires to a stacking device has been conducted by conveying tires in a one-by-one fashion towards the stacking device by means of a conveyor, stopping a tire when it has reached a position near the stacking device, and manually conveying the tire one by one to the stacking device. In another known tire supplying system, a tire stopping device and a conveying device for conveying the stopped tire one by one are used in combination.

The supply of the tire relying upon the manual work suffers from an impractically low efficiency of the work, as well as a huge labour cost, due to the necessity for much human labour. On the other hand, the known system which makes use of a combination of the tire stopping device and the tire conveying device requires a complicated mechanism for clamping and conveying the tire one by one, as well as a large installation space for such devices and mechanism. In addition, a complicated control is required for operating both the tire stopping device and the tire conveying device smoothly in a timed relation.

The shelving of the stack of tires has been conducted manually by placing the stack of tires in a frame pallet. In some cases, a fork lift with clamp arms capable of clamping the stack of tires, or a power-driven roller conveyor capable of clamping the tire stack at upper and lower sides thereof is used. The method which makes use of a fork lift, not to mention the manual shelving, is inferior in the efficiency of the work, because it requires much human labour, as well as a high degree of skill. The method which employs the roller conveyor encounters a difficulty particularly when the stack of tires is placed at an offset from the center of the storage position on the frame pallet, although this method improves the efficiency appreciably.

In some cases, a special consideration has to be given to the orientation or posture of the tires to be stacked. Namely, when each of the tires to be stacked has a white belt or white characters on the side walls thereof, there is a fear that the white belt or white characters may be contaminated when the black other side wall of the adjacent tire is placed directly thereon. In such a case, it is necessary that every other tire be inverted so that the tires make contact at their white sides or black sides. The inversion of the tire also has relied upon manual labour and, hence, has suffered from low working efficiency and large labour cost.

SUMMARY OF THE INVENTION

Accordingly, an object of the present invention is to provide a tire handling system which is capable of performing fully automatically a series of operations starting from the sorting till the shelving, thereby overcoming the above-described problems of the prior art.

Another object of the present invention is to provide a tire handling system in which the constructions of automatic devices incorporated in the system are simplified so as to lower the cost of the system as a whole.

To these ends, according to one aspect of the present invention, there is provided a tire handling system having an automatic tire sorting device, a tire stacking device for stacking tires, an automatic tire supplying device for automatically supplying the tire stacking device with the tires sorted by the tire sorting device, and a tire shelving device for receiving the stacks of tire and placing the stacks of tires in frame pallets, wherein the tire shelving device includes: a tire receiving conveyor for conveying the stacks of tires to a predetermined position; a conveyor line installed in the vicinity of the predetermined position and extending in the direction transverse to the tire receiving conveyor, the conveyor line being adapted to convey the frame pallets; tilting means adapted for carrying the pallets and capable of performing a 90° tilting motion between a first position at which the pallets are laid aside the predetermined position and a second position adjacent to the first position and where the pallets stand upright on the conveyor line; pushing means disposed to oppose the pallets in the first position across the tire receiving conveyor and adapted to engage with the stacks of tires on said tire receiving conveyor so as to push said stacks of tires into said pallets in said first position; and automatic centering means provided on the portion of said pushing means engageable with said stacks of tires and adapted to center said stacks of tires with respect to a predetermined central axis.

Preferably, the tire supplying device of the tire handling system includes a conveyor line arranged along a slant plane descending towards the tire stacking device, stopper means disposed on the end of said conveyor line adjacent to said tire stacking device and having a height suitable for stopping a tire which is being conveyed by said conveyor line, and a movable conveyor forming a portion of said conveyor line adjacent to said tire stacking large enough to carry a tire thereon and movable between an upper position and a lower position with its one end moving along said stopper means, has said one end placed at a level below the upper end of said stopper means and the other end placed on said conveyor line so as to enable said stopper means to stop a tyre conveyed by said conveyor line and, when in said upper position, has said one end placed at a level above said upper end of said stopper means so as to allow said tire to move over said upper end of said stopper means, while the other end is positioned above said conveyor line so as to stop a succeeding tire.

The tire handling system of the invention can have an automatic tire inverting device which inverts selected tires out of a series of tires which are conveyed with their one side walls resting on a conveyor. The tire inverting device has a casing of a size large enough to receive a tire and disposed along said conveyor line which descends towards said tire stacking device, said casing having an entrance and an exit which open on said conveyor line and sizes large enough to enable said tire to pass therethrough, an opening and closing means for selectively opening and closing said exit, and inverting means for turning said casing upside down through 180° such that said entrance and said exit are reversed.

The above and other objects, features and advantages of the present invention will become clear from the following description of the preferred embodiment when the same is read in conjunction with the accompanying drawings.

DESCRIPTION OF THE PREFERRED EMBODIMENTS

Figure 1:
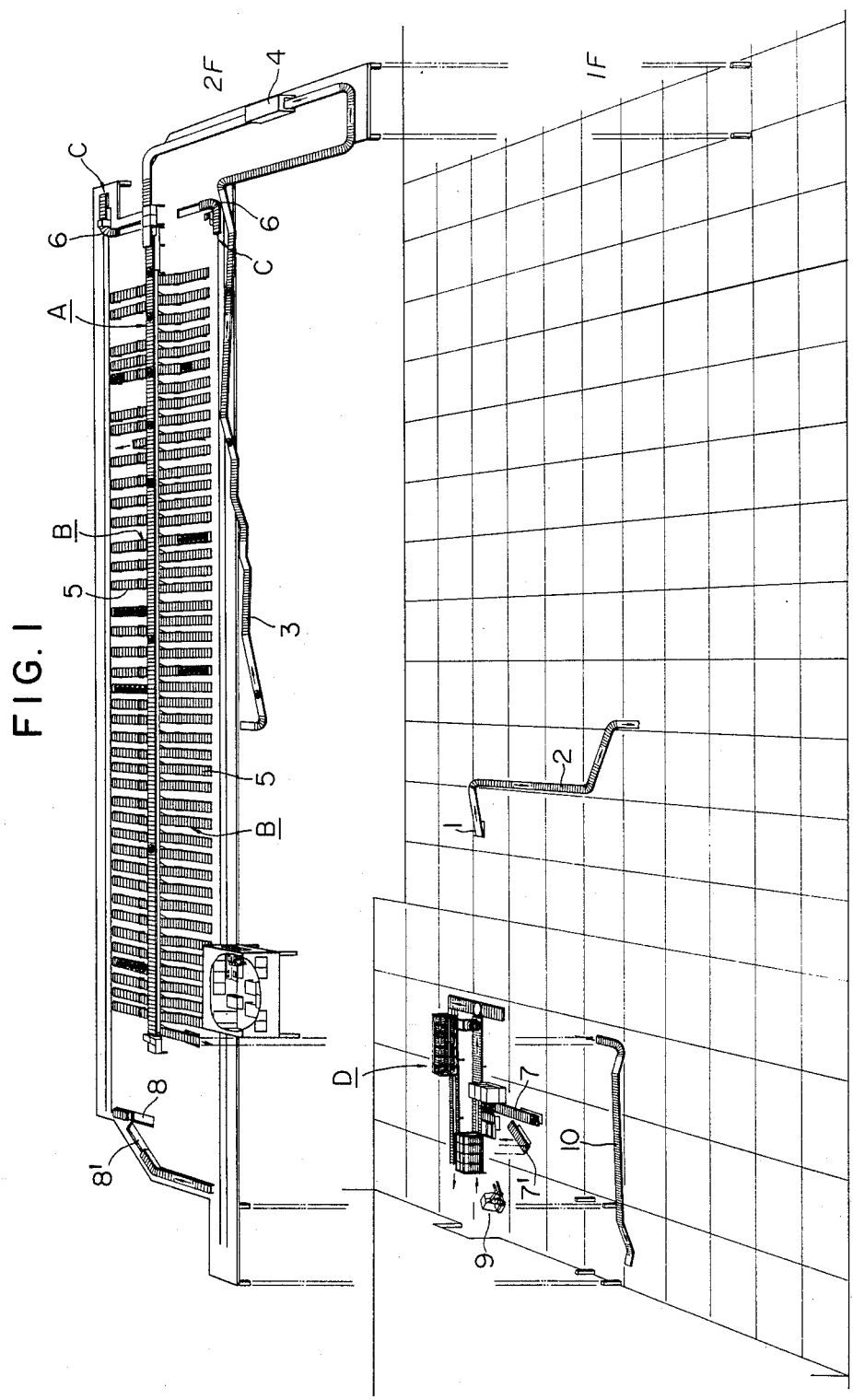
FIG. 1 is a schematic perspective view of the whole portion of a tire handling apparatus in accordance with the present invention.

As shown in FIG. 1, the tire handling system in accordance with the present invention is conveniently installed in a two-storied building. Tires forwarded from a production/inspection line are conveyed from an underground station to a first floor by means of a conveyor 2 which runs through an opening formed in the ground floor. The conveyor 2 is connected to a conveyor 3 which runs from the underside of the second floor to a side of the same. The tires which have been transferred from the conveyor 2 to the conveyor 3 are sent to a sorting device A installed on the second floor, through a reading section 4. The sorting device A is constituted by an endless belt in which a plurality of pallets are connected in series. A plurality of tire sorting lines 5 are arranged on both sides of the sorting device A so as to receive tires sorted by the latter. The arrangement is such that each pallet is adapted to tilt when it passes a particular sorting line 5 so that the tire carried by the pallet slides into the particular sorting line 5. The sorting line 5 to which the tire is to be delivered is determined as the type, standard and the size of the tire are read when the tire passes through the reading section 4. Each sorting line 5 is provided with a tire stacking device B. The tires delivered to each sorting line are supplied one by one by a later-mentioned automatic tire supplying device to the stacking device B and are stacked by the stacking device B. In the case where the tires have white side walls or white characters on one side thereof, the tires have to be stacked so that the white sides or the black sides of adjacent tires face each other. To this end, it is necessary that every other tire on each sorting line is inverted. A later-mentioned tire inverting device is therefore disposed between the automatic tire supplying device and the stacking device B.

The stack of the tires is pushed forward by the succeeding stack and reaches the outlet of the sorting line 5. A rail track is laid along the outlets of the sorting lines 5. Shuttle cars C are adapted to run on the rail track. In FIG. 1, the shuttle car C is shown in a waiting position. The shuttle car C is provided with a curved conveyor 6 having an entrance which is adapted to face the outlet of the sorting line 5 when the shuttle car C is positioned aside the sorting line 5. The conveyor 6 is adapted to received several stacks of tires from the sorting line 5. The shuttle car C then runs along the rail track to the left end position as viewed in FIG. 1 and delivers the stacks of tires to lifters 7, 7'. The lifters 7, 7' are vertically movable between the first and the second floors and are adapted to be stationed, when they have ascended to the second floor, in openings 8,8' formed in the second floor. The stacks of tires moved down to the first floor by the lifters 7,7' are delivered to a tire shelving device D and are shelved on a frame pallet. The thus shelved stacked of tires are conveyed to a store house by means of a fork lift 9. A reference numeral 10 designates a conveyor for conveying tires which have overflown the sorting device A.

Figure 2:
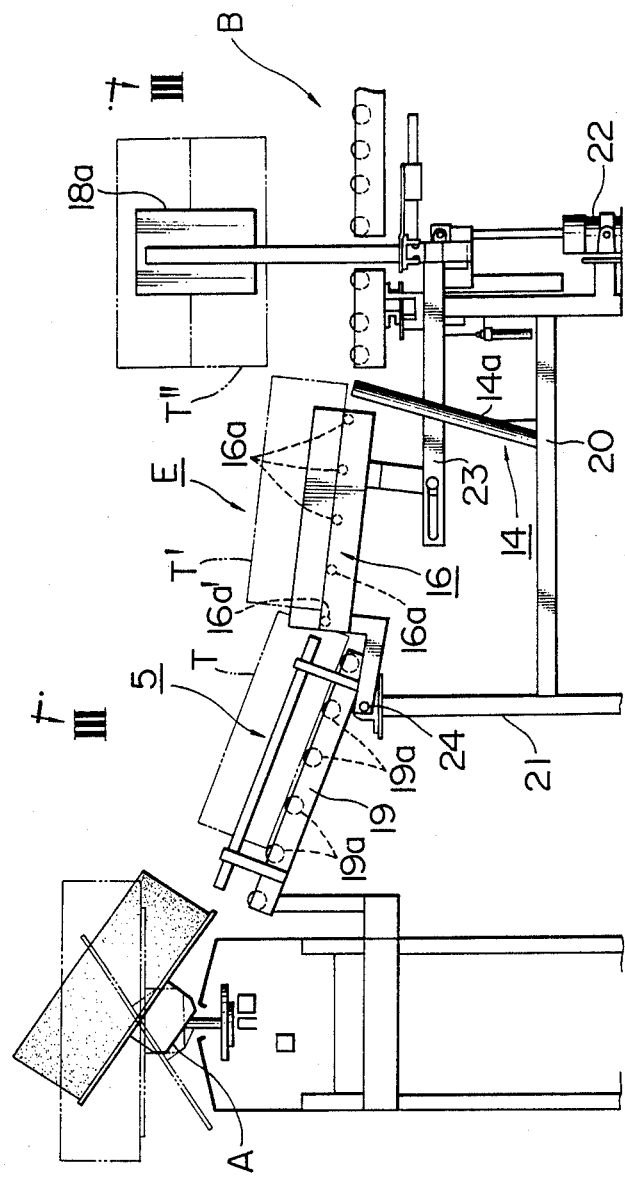
FIG. 2 is a front elevational view of an example of a tire supplying device incorporated in the tire handling system of the present invention.
Figure 3:
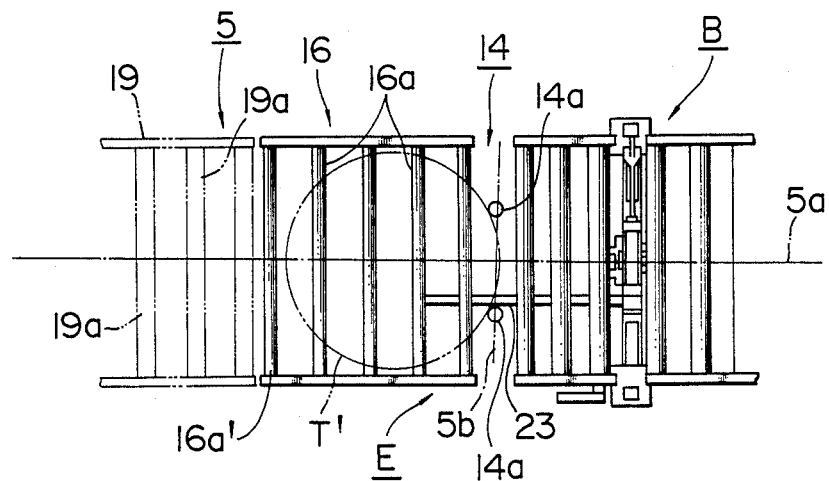
FIG. 3 is a plan view taken along the line III—III of FIG. 2.
Figure 4:
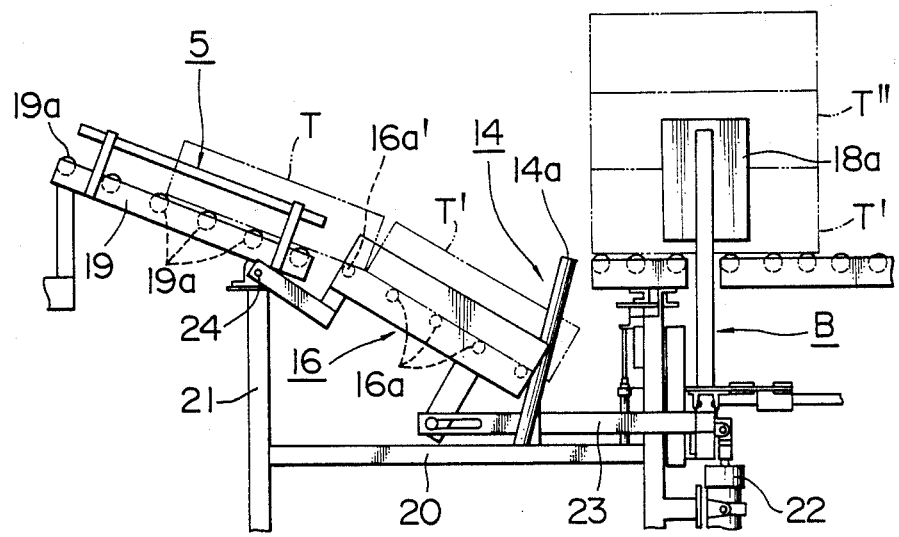
FIG. 4 is a front elevational view of a swingable conveyor incorporated in the device shown in FIG. 2, placed in the lowermost end of its stroke.
Figure 5:
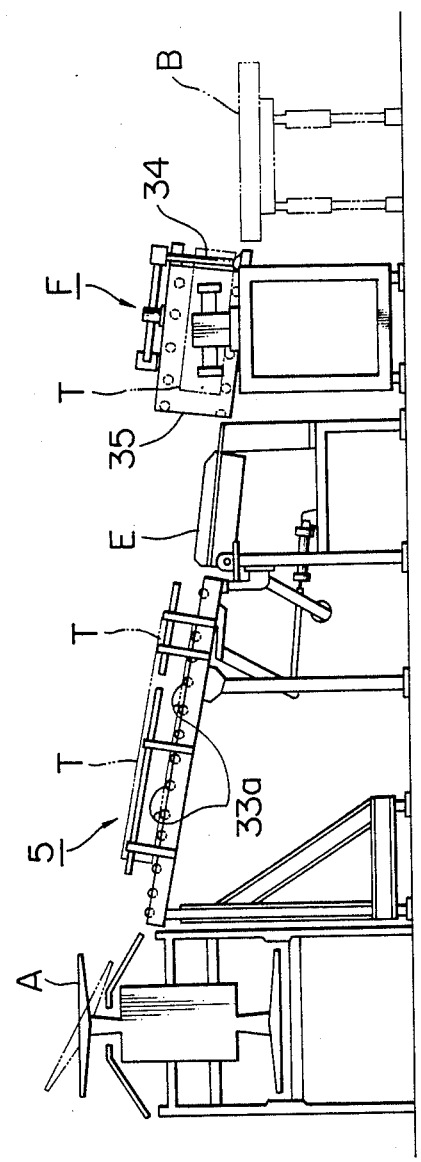
FIG. 5 is a front elevational view of the tire handling system of the present invention equipped with a tire inverting device installed in the sorting line of the system.

The detail of an example of the automatic tire supplying device, which is disposed between the sorting device A and the stacking device B, is shown in FIGS. 2 to 4.

This automatic tire supplying device, represented by a symbol E, has a stationary stopper portion 14 for stopping the tires T on the sorting line 5, and a movable conveyor 16 which constitutes a part of the sorting line 5. As will be seen from FIGS. 2 and 4, the movable conveyor 16 is adapted to move along the stationary stopper portion 14 between a position where it causes the tire T to be stopped by the stopper portion 14 and a position where it can deliver the stopped tire T'.

In this embodiment, the sorting line 5 is installed at an inclination so as to extend between the tire sorting device A and the tire stacking device B which is installed at a level below that of the sorting device A. The sorting line 5 is constituted by a chute 19 and the movable conveyor 16 which are provided with free rollers 19a and 16a, respectively.

The stationary stopper portion 14 is constituted by a pair of stopper bars 14a, 14a, which are extended upward and fixed to the installation base 20 of the sorting line 5 in such a manner as to incline towards the downstream side as viewed in the direction of flow or conveyance of the tires, as will be seen from FIGS. 2 and 3.

To positions at which the stopper bars 14a, 14a are fixed are the positions where they can automatically center the tire T which has been stopped by these stopper bars 14a, 14a. More specifically, the stopper bars 14a, 14a are positioned on both sides of the longitudinal axis 5a of the sorting line 5 at an equal distance from the axis 5a and on a line 5b which is perpendicular to the axis 5a.

The movable conveyor 16 is pivotally secured at its end adjacent to the sorting device A to the supporting portion 21 for supporting the chute 19, while the other end of the movable conveyor 16, i.e., the end adjacent to the stacking device B, is pivotally connected to an interlocking bar 23 which is provided on a driving device 22 for driving the tire clamping portion 18a of the stacking device B and movable together with the driving device 22. Thus, the movable conveyor 16 is swingable along the stopper bars 14a about the axis of pivotal connection 24 to the supporting portion 21, as will be understood from FIG. 3.

When the movable conveyor 16 is in the lower end of its stroke, the upper ends of the free rollers 16a on the movable conveyor 16 form an inclined surface substantially flush with the inclined surface presented by the free rollers 19a on the chute 19, and the stationary stopper portion 14 is located on the extension of the inclined surface presented by the free rollers 16a.

When the movable conveyor 16 is in the upper end of its stroke, the extension of the surface presented by the upper ends of the free rollers 16a assumes a level above the upper ends of the stopper bars 14a of the stationary stopper portion 14. In this state, the movable conveyor 16 is so inclined that the free roller 16a' adjacent to the sorting device A takes a level above the level of the free roller 19a of the chute 19 adjacent to the stacking device B. Thus, the movable conveyor 16 is still inclined towards the stacking device B even in this state, so that the tire on the movable conveyor 16 is moved towards the stacking device B by the force of gravity, as will be seen from FIG. 2.

The automatic tire supplying device E having the described construction is adapted to supply, in a one-by-one fashion, the conveyed tires T in a manner which will be explained hereinafter.

The tire T coming from the sorting device A is transferred to the chute 19 and then to the movable conveyor 16. The movement of the tire on the chute 19 and the movable conveyor 16 is possible because the tire can freely roll on the free rollers 19a, 16a by the force of gravity. Meanwhile, as shown in FIG. 4, the movable conveyor 16 is in the lower stroke end of its swinging motion.

When the stopping of the tire T by the stopper bars 14a, 14a is confirmed, the driving device 22 is activated to swing the movable conveyor 16 to the upper position. Meanwhile, the tire T' is held in contact with the stopper bars 14a, 14a, as shown in FIG. 2.

When the movable conveyor 16 has been swung to the upper end of its swinging stroke, the tire T' takes a position higher than the upper end of the stopper bars 14a, 14a so that it slides towards the stacking device B by the force of gravity. Meanwhile, the preceding tire T" which has reached the stacking device B, has been clamped by the clamping portion 18a and has been lifted by the driving device 22, so that the succeeding tire T' can slide into the position which has been occupied by the preceding tire T".

After the tire T' has been sent to the stacking device B, the driving device 22 is activated to swing the movable conveyor to the lower end of its swinging stroke. As a result, the tire T" which has been raised by the clamping portion 18a is placed and stacked on the tire T', as well be seen from FIG. 4.

A new tire T is then supplied after the movable conveyor 16 has been swung to the lower stroke end thereof. The tire T has been stopped as it contacts the tire T' when the movable conveyor 16 is in its lower end of the stroke. After the swinging of the movable conveyor 16 to the upper stroke end, the new tire T has been stopped as it contacts the free roller 16a' of the movable conveyor 16 adjacent to the sorting device A. When the movable conveyor 16 has been swung to its lower stroke end, the tire T is released from the free roller 16a' so that it moves onto the movable conveyor 16 by the force of gravity.

When this new tire T moved onto the movable conveyor 16 is stopped upon contact with the stopper bars 14a, 14a of the stationary stopper portion 14, the movable conveyor 16 is swung upward so that the new tire T is delivered to the stacking device B.

This operation is cyclically repeated so that the tires T are supplied in one-by-one fashion to the next section which is, in this case, the stacking device B of the tire handling system.

The described construction of the stationary stopper portion is only illustrative and various other constructions can be used provided that they can stop the tire on the sorting line while automatically centering the same.

The described construction of the movable conveyor also is not exclusive. Thus, the movable conveyor can have any suitable construction which is movable along the stationary stopper portion between the position where the conveyed tire is stopped by the stationary stopper portion and a position where it can deliver the tire and which is capable of contacting a new tire on the sorting line when in the tire delivery position.

The automatic tire supplying device having the described construction offers the following advantages.

(1) The movable conveyor is installed as a part of the sorting conveyor line, in such a manner as to be able to move between a position where it causes the conveyed tire on the sorting conveyor to be stopped by the stopper portion and a position where it can deliver the stopper tire and also in such a manner as to be able to contact, when it is in the delivery position, a new tire on the sorting conveyor.

Conventionally, the stopping of successive tires and the delivery of the stopped tire are conducted by independent devices and complicated control is required for operating these devices in a timed relation. In contrast, the tire supplying device of the described embodiment can supply, in one-by-one fashion, the tires which have been successively conveyed by the sorting conveyor without any clearance between adjacent tires, to the next section of the tire handling system. Since the movable conveyor of the tire supplying device is constructed as a part of the sorting conveyor, the space which would required by the conventional system for the installation of independent devices for stopping and delivery of the tires, as well as complicated control system for controlling the operation of such devices, are dispensed with.

(2) The stationary tire stopping section is capable of automatically centering the tire when it stops the tire. In addition, the movable conveyor is adapted to move along the stationary stopper portion. It is, therefore, possible to move the stopped tire to the delivery position while the tire is held in contact with the stationary stopper portion, i.e., while the tire is in the centered state.

It is, therefore, possible to effect the stopping of the tire and the supply of the stopped tire in one-by-one fashion, while correctly centering the tire.

The sorting line 5 which is used for tires having white side walls on their one sides are provided with an automatic tire inverting device F disposed between the automatic tire supplying device E described above and the tire stacking device B. The detail of an example of the automatic tire inverting device is shown in FIGS. 5 to 9.

The automatic tire inverting device F is constituted mainly by a stopper portion 34 which is adapted to be opened and closed in the sorting line 5 for the tires T, and a inverting portion 35 on which the stopper portion 34 is provided. The automatic tire inverting device F is installed on a portion of the sorting line 5 upstream of the tire stacking device B, as will be best seen from FIG. 5. In this Figure, symbol A represents a sorting device, while E represents an automatic tire supplying device which is capable of supplying tires in a one-by-one fashion. The sorting device A and the supplying device E are provided along each sorting line 5.

Figure 6:
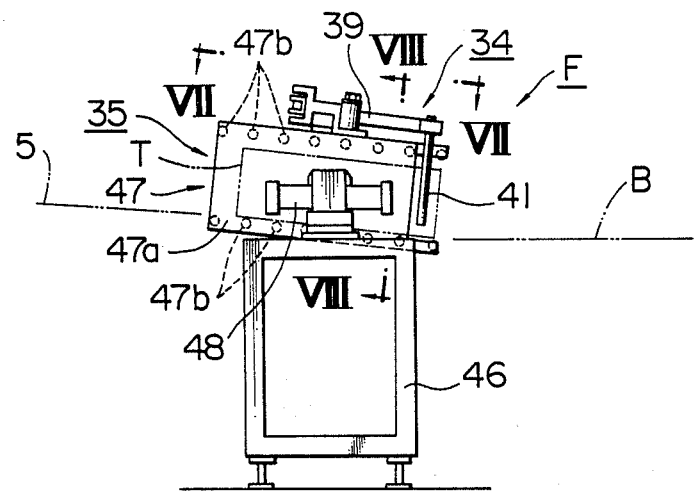
FIG. 6 is an enlarged front elevational view of the inverting device.
Figure 7:
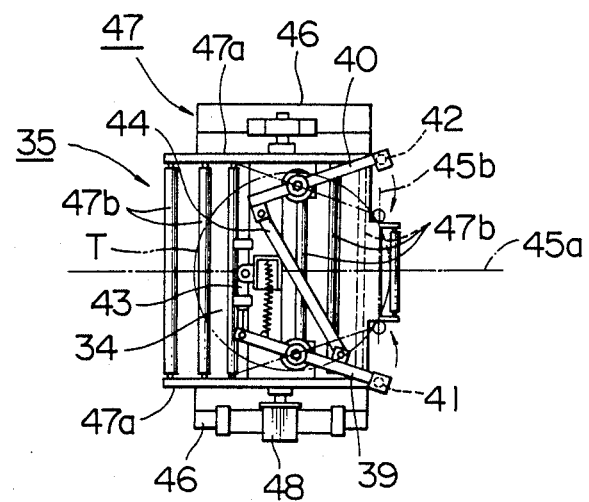
FIG. 7 is a plan view taken along the line VII—VII of FIG. 6.
Figure 8:
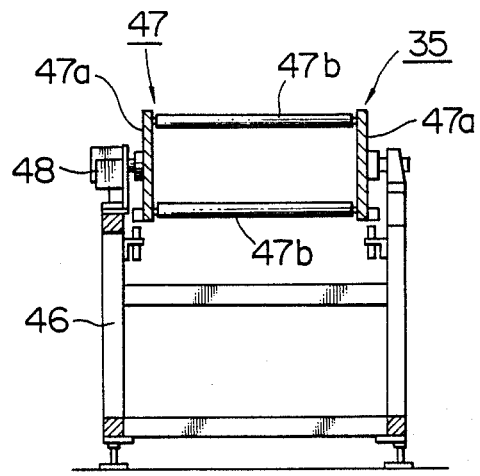
FIG. 8 is a sectional view taken along the line VIII—VIII and viewed in the direction of the arrow in FIG. 6.
Figure 9:
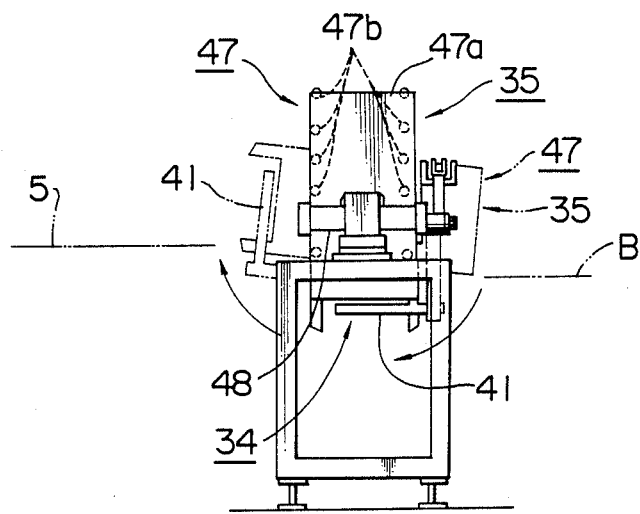
FIG. 9 is a front elevational view of a tire inverting device shown in FIG. 6 during tire inverting operation.

As will be seen from FIGS. 6 to 8, the stopper portion 34 includes a pair of stopper bars 41, 42 suspended downward from the lower ends of two rocker arms 39, 40, a driving portion 43 for driving one of the rocker arms 39, and a connecting arm 44. The connecting arm 44 is pivotally connected to the end of the rocker arm 39 adjacent to the stopper bar 41 and the end of the rocker arm 40 remote from the stopper bar 42.

The stopper bars 41 and 42 are movable between an open state in which they are stationed on both sides of the sorting line 5 so as to form therebetween a clearance which is large enough to permit the tire T to pass therethrough, and a closed state in which they are brought together to positions where they contact and stop the tire T conveyed along the sorting line 5. Usually, the stopper bars 41, 42 are stationed on both sides of the sorting line 5, i.e., in the open state.

It is, therefore, possible to stop the tire T by moving both stopper bars 41 and 42 to the closed position. Preferably, the arrangement is such that, when both stopper bars 41, 42 are in the closed positions, they are located on both sides of the axis 45a of the stacking device B at an equal distance from the axis 45a and on a line 45b which is perpendicular to the axis 45a. With such an arrangement, it is possible to automatically center the tire T with respect to the stacking device B.

The inverting portion 35 has a container portion 47 having the stopper portion 34 and journaled to a stationary frame 46 in such a manner as to be able to invert the tire T while the tire T is held in contact with the stopper bars 41, 42, and a rotary driving section 48 capable of rotating the container portion 47.

The container portion 47 includes a pair of side walls 47a, 47a which are disposed at an equal distance from the sorting line 5 and a plurality of free rollers 47b which are disposed between the upper ends, as well as between the lower ends, of the side walls 47a, 47a. The free rollers 47a are similar to the free rollers 33a on the sorting line 5. Thus, the side walls 47a, 47a and the free rollers 47b, 47b in combination constitute a substantially rectangular cross-section of the container portion 47.

The rocker arms 39 and 40 are rockably secured at their substantially mid portions to the upper end surfaces of the side walls 47a, 47a, so that the opening and closing action of the stopper bars 41, 42 is conducted at a position immediately downstream of the end of the container portion 47 adjacent to the stacking device B.

When tires having white side walls on their one side are delivered to the sorting line 5, the automatic tire inverting device F operates in a manner which will be explained hereinafter.

The tires T from the sorting device A are delivered to the sorting line 5 which extends obliquely downwardly from the sorting device A to the stacking device B which is positioned at a level below the level of the sorting device A and which has free rollers 33a. Meanwhile, the container portion 47 which constitutes the inverting portion 35 of the automatic tire inverting device F is stationed by the rotary driving device 48 at such an inclination that the inclined surface presented by the free rollers 47b thereon is flush with the inclined surface presented by the free rollers 33a on the sorting line 5.

The tires delivered to the sorting line 5 are fed to the automatic tire supplying device E which supplies, in a one-by-one fashion, the tires T to the container portion 47 which constitutes the inverting portion 35 of the automatic inverting device F. The operation down to this step will be understood when the description is read in conjunction with FIG. 5.

Then, a judgement is conducted as to whether the tire has a white side wall in its obverse or reverse side. The judgement is conducted by means of, for example, bar codes attached to the tires. In accordance with the result of the judgement, a decision is made as to whether the stopper bars 41, 42 are to be moved to the closing position or whether the same should be held in the open state.

If a tire T having a white side wall on its obverse side has been passed, the next tire T' has to be delivered in such a manner that its white side wall is directed downward, in order to prevent any contamination of the white side wall of the preceding tire, by the black side wall of the succeeding tire.

This means that, if the tires having white side walls and the tires having black side walls are conveyed alternatingly, it is not necessary to invert the tires so that the stopper bars 41, 42 of the stopper portion 34 are kept in the open state to pass these tires.

When the new tire T' is oriented in the same direction as the preceding tire T, e.g., when both the preceding tire T and the new tire T' are placed with their white side walls directed upward, the driving portion 43 drives the stopper bars 41, 42 of the stopper portion 34 to the closed position so as to stop the new tire T' and to receive the stopped tire T' in the container portion 47 of the inverting section 35, as will be seen from FIG. 7.

Then, the rotary driving portion 48 is operated to turn the container portion 47 upside down, i.e., 180° with the tire T' held in contact with the stopper bars 41, 42, so that the white side wall of the new tire T' is directed downward. The new tire T is then conveyed to the next section of the tire handling system, i.e., the stacking device B in this case. This operation will be understood when the description is read in conjunction with FIG. 9.

The movement of the tires T is effected by the force of gravity, as the tire T can roll on the free rollers 33a, 47b on the sorting line 5 and the container portion 47 of the inverting portion 35 which are held at an inclination. Similarly, the contact of the tire with the stopper bars 41, 42 is effected by the force of gravity.

As will be understood from the foregoing description, with the automatic tire inverting device of the present invention, it is possible to selectively invert the tires T, T' such that a tire T' having the side wall directed upward comes next to the tire T which is oriented to direct its black side wall upward. In consequence, the stacking device B can stack successive tires such that the same sides of the adjacent tires, e.g., the sides with white side walls, are held in contact with each other.

The described constructions of the stopper portion and the inverting portion of the automatic tire inverting device are only illustrative. Namely, any other suitable construction can be adopted provided that it has a stopper portion capable of stopping tires successively conveyed along the sorting line and a tire inverting portion which is capable of inverting the tire while keeping the tire in contact with the stopper portion.

The automatic tire inverting device having the described embodiment offers the following advantages.

(1) The automatic tire inverting device enables the tires to be conveyed with their white side walls directed upward or downward as desired, thus eliminating the necessity for the manual labour which heretofore has been necessary to stack the tires such that the same sides of the adjacent tires, e.g., white side walls, held in contact with each other. Hitherto, when tires with white side walls are sent to the stacking section, it has been necessary that the workers selectively invert the tires in such a manner that the alternating tires exhibit the same sides directed upward, i.e., in such a manner that when a tire is sent with its white side wall directed upward, the next tire is sent with its white side directed downward. According to the described embodiment, it is possible to eliminate all such manual works, and to effect such selective inversion of the tires fully automatically and without fail.

This in turn enables the stacking device to merely stack the successive tires, so that it is possible to easily automate the stacking operation which is conducted by the stacking device and the efficiency is greatly improved, even when the tires have white side walls which are strictly required not to be contaminated.

(2) The automatic tire inverting device has a simple construction composed of a stopper portion which is disposed on the sorting line and adapted for selectively opening and closing the passage for the tires, and an inverting portion capable of accommodating the tire and inverting the same. The stopper portion in the closed state is capable of stopping the tire on the sorting line and inverting the tire upside down while the tire is held in contact with the stopper portion. It is advantageous that this simple arrangement ensures that the tires delivered to the stacking device is inverted in such a manner that the tires with their white side walls directed upward appear alternatingly.

Another advantage is that, by arranging such that the tire stopped by the stopper portion is centered by the stopper portion with respect to the stacking device, it is possible to keep the tire precisely in alignment with the stacking device, because the tire is held in contact with the stopper portion even during the inversion.

Furthermore, since the tire is inverted while it is held in contact with the stopper portion, it is not necessary to provide any specific means for fixing the tire to the inverting section during the inverting operation.

FIGS. 10 to 14 in combination show the detail of an example of the shelving device D incorporated in the tire handling system of the invention.

The tyre shelving device D has a tire receiving conveyor 53 for conveying a stack of tires T to a position where a frame pallet 52 is stationed, a pushing portion 54 which pushes the stack of tires T on the tire receiving conveyor into the frame pallet 52, an automatic centering device 55 provided on the pushing portion 54 and adapted to automatically eliminate any offset of the tires T of the stack when the stack is pushed into the frame pallet 52, a floating portion 56 adapted for floating the stack of tires T slightly above the level of the tire receiving conveyor 53 so as to enable the stack to move freely in any direction when the stack is pushed onto the pallet, a pallet tilting portion adapted for tilting the frame pallet 52 carrying the stack of tires T 90° so as to transfer the tires onto a conveyor line 57, and a pallet sliding portion 59 for causing the pallet on the conveyor line 57 to slide thereby preventing any bridging phenomenon exhibited by the tires shelved in the frame pallet.

Figure 11:
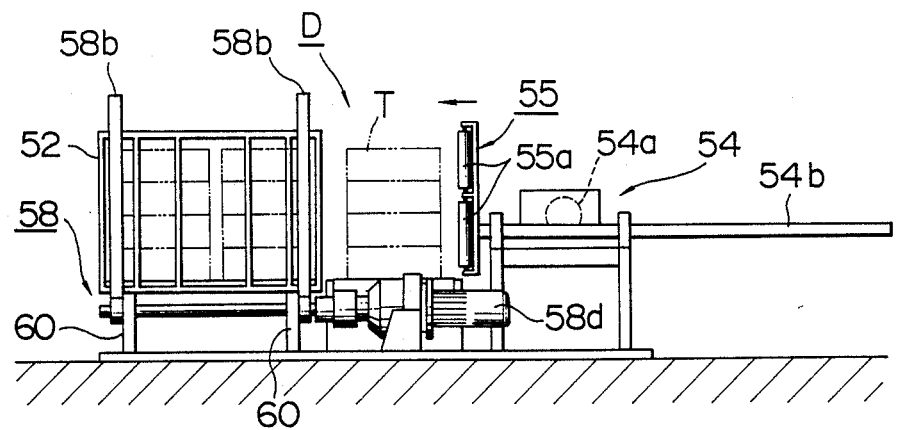
FIG. 11 is a front elevational view of the tire shelving device taken along the line XI—XI and viewed in the direction of arrow in FIG. 10.
Figure 12:
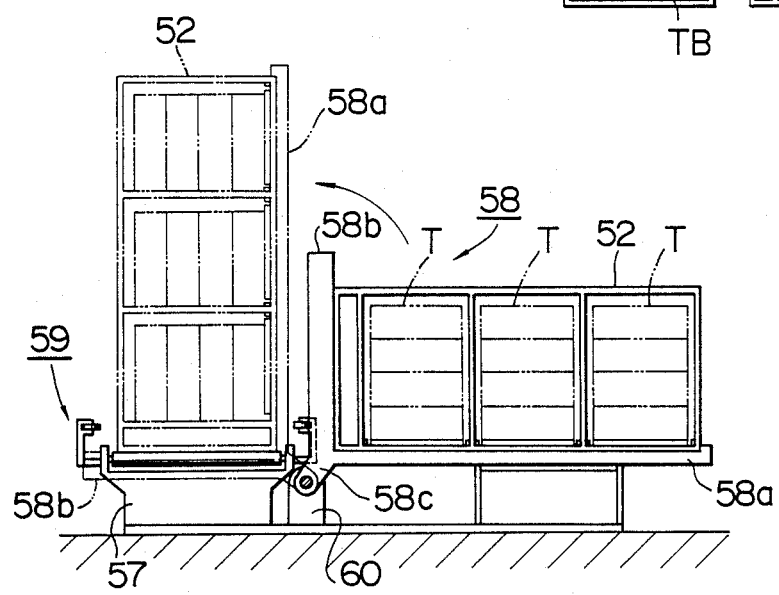
FIG. 12 is a sectional view taken along the line XII—XII and viewed in the direction of the arrow in FIG. 10.
Figure 13:
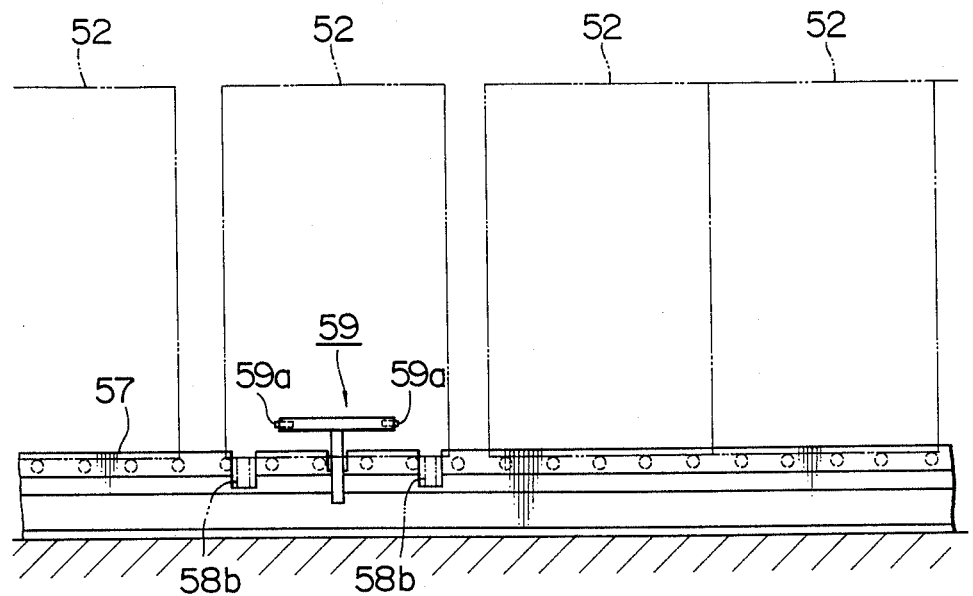
FIG. 13 is an enlarged front elevational view taken along the line XIII—XIII and viewed in the direction of the arrow in FIG. 10.

As will be seen from FIGS. 10 to 12, the frame pallet 52 is placed with its one lateral side directed downward, on tilting arms 58a of the tilting portion 58, the tilting arms 58a being disposed in a side-by-side fashion to the tire receiving conveyor 53 and will be explained later in more detail.

The pushing portion 54 has pushing rods 54b which are adapted to be selectively extended into a space above the tire receiving conveyor 53 by the operation of an actuator 54a so that, when the pushing rods 54b are extended, the ends of these rods 54b contact and push the stack of the tires T so as to forcibly move the same into a vacant pallet 52. In the described embodiment, the pushing portion 54 employs three pushing rods 54b which are arranged to project along the axes 52a of storage of three vacant pallets 52 so that three stacks of tires T are pushed at once. An automatic centering portion 55 is provided on the distal end of each pushing rod 54b so as to be able to contact the stack of tires T when the pushing rod 54b is extended. The automatic centering portion 55 includes a pair of tire contacting rollers 55a, 55a which are disposed on both sides of the axis 52a of storage of each pallet 52 at an equal distance from the axis 52a and on a line which is perpendicular to the axis 52a. The tire contacting rollers 55a have their axes extended in the direction of the stack of tires. In the illustrated embodiment, each tire contacting roller 55a has an upper section and a lower section so that it can contact a plurality of tires of each stack.

The arrangement of the tire contacting rollers 55a enables the stack of tires to be automatically centered with respect to the axis 52a of storage in the pallet 52 when the stack is forcibly moved into the pallet 52 by the action of the pushing rod 54b of the pushing portion 54. During this automatic centering operation, the stack of tires T is flotated by the operation of the floating portion 56 so as to be movable freely in any direction. The pushing and centering operation will be understood when the description is read in conjunction with FIGS. 10 and 11.

Figure 10:
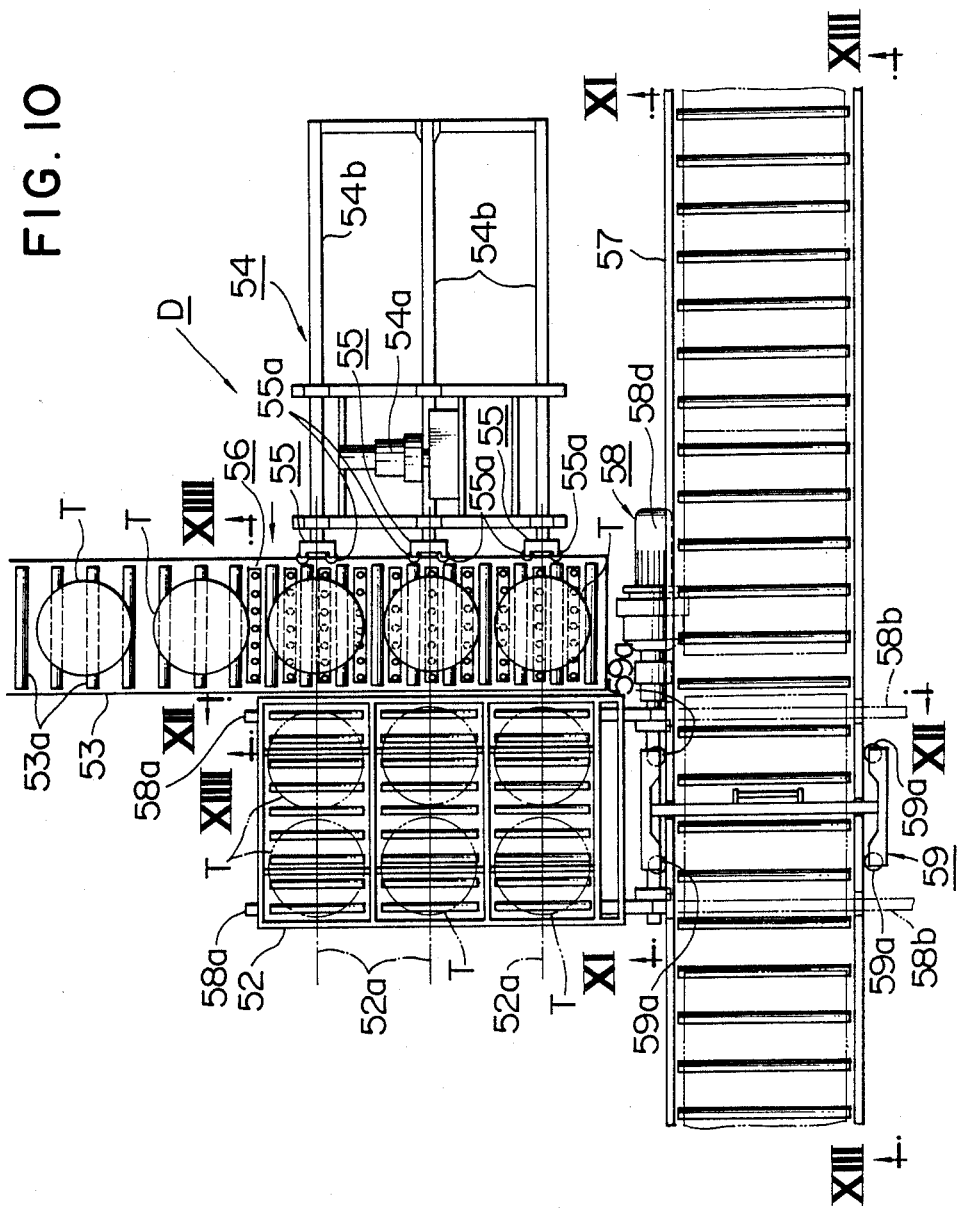
FIG. 10 is a plan view of an example of a tire shelving device incorporated in the tire handling system of the present invention.
Figure 14:
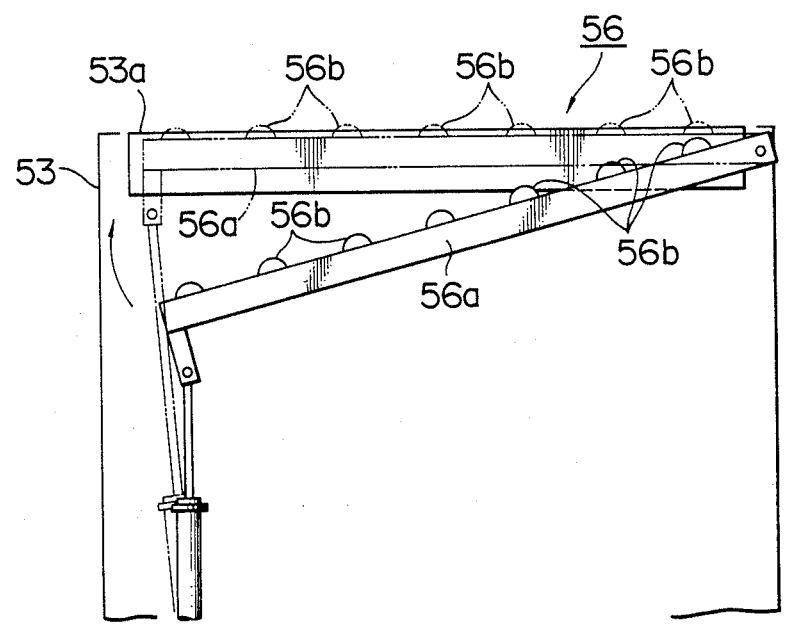
FIG. 14 is a sectional view taken along the line XIII—XIII of FIG. 10.

As will be seen from FIGS. 10 and 14, the floating portion 56 has swingable bases 56a which are swingably disposed between adjacent rollers 53a, 53a of each tire receiving conveyor 53, and a plurality of free balls 56b which are arranged along the length of each swingable base 56a. A plurality of floating portions 56 are disposed so as to confront respective pallets 52. The arrangement is such that the swingable bases 56a swing in synchronism and, when the swingable bases 56a have swung to the upper end of their swinging stroke, the free balls 56b slightly project to a level above the upper surface of the tire receiving conveyor 53 so as to constitute a ball conveyor. In this state, the stack of the tires T is carried by the ball conveyor rather than by the tire receiving conveyor. In other words, the stack of tires T slightly floats above the level of the tire receiving conveyor so as to be able to move in any direction thanks to the rolling contact with the free balls 56b. Needless to say, the free balls 56 are retracted below the surface of the tire receiving conveyor 53 when the stacks of tire T are being conveyed by the tire receiving conveyors 53.

The pallet tilting portion 58 has a pair of L-shaped arms each including a tilting arm 58a and a tilting arm 58b. The L-shaped arm is adapted to pivot in a vertical plane about the bent portion 58c where both tilting arms 58a and 58b are integrated with each other, by the action of a tilting driving device 58d. More specifically, the L-shaped arm is swingably supported at its bent portion 58c by a bearing 60 which is disposed between the tire receiving conveyor 53 and the conveyor line 57, as will be understood from FIGS. 10 and 12.

In the described embodiment, the conveyor line 57 is arranged so as to convey the tires in a direction perpendicular to the direction of convegance by the tire receiving conveyor 53, and is disposed at the downstream end of the tire receiving conveyor 53. Therefore, the tilting arms 58a first carry the frame pallets 52 which have been turned sideways and then rotate from the position where the arms 58a lay at one side of the tire receiving conveyor 53 to a position where they are positioned at one side of the conveyor line 57.

A pallet sliding portion 59 is disposed at a position where the pallets 52 are placed on the conveyor line 57. The pallet sliding portion 59 has contact rollers 59a capable of contacting side surfaces of the pallets 52 and slide driving portions which are adapted to move the contact rollers 59a in directions perpendicular to the direction of convegance of the conveyor line 57. Thus, the frame pallets 52 are slided as they are pushed by the contact rollers 59a. In the illustrated embodiment, the contact rollers 59a are disposed on both sides of the conveyor line 57 such that the pallets can be clamped between the contact rollers 59a, as will be seen from FIGS. 10, 12 and 13.

The shelving operation of the shelving device D having the described construction is conducted in a manner which will be explained hereinunder.

The tire receiving conveyor 53 operates to bring the stacks of tires T to positions where they confront pallets 52 which have been turned upside down and placed on the tilting arms 58a of the pallet tilting portion 58. In this state, the tire receiving conveyor 53 is stopped and the stacks of the tires on the conveyor 53 can be forced into the vacant pallets 52 by the action of the pushing portion 54.

Then, the pushing portion 54 operates to extend its pushing rods 54b so as to force the stacks of tires T on the receiving conveyor 53 onto the pallets 52. This operation is conducted twice so that six stacks, three stacks in each operation, are forced into the pallets 52.

During the pushing of the stacks by the pushing device 54, the automatic centering portions 55 on the pushing rods 54b serve to automatically center the stacks of tires T with respect to the axes of storage in respective pallets 52. Meanwhile, the floating portion 56 slightly lifts the stacks of tires T so that the latter float above the surface of the tire receiving conveyor 53.

After the stacks of tires T have been received in the respective pallets 52, the driving portion 58d of the pallet tilting portion 58 is activated so that the frame pallets 52 are turned upright while being supported by the tilting arms 58a, 58b, so as to be placed on the conveyor line 57.

Figure 15:
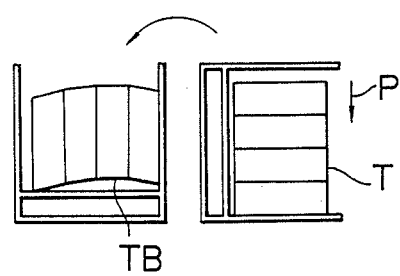
FIG. 15 is a front elevational view of shelved tires in a so-called bridging state.

The pallets 52 now placed on the conveyor line 57 are then slided by the operation of the pallet sliding portion 59. This sliding operation is intended for the following purpose. Referring to FIG. 15, the tires T held in stacked condition are tightly compressed by pressure P generated by the force of gravity. Therefore, when the tires are shelved in the pallets and turned upright in accordance with the swinging of the pallet tilting portion 58, the tires exhibit such a tendency that they do not rest on the bottom of the pallet but are held above the bottom as indicated by TB. This phenomenon is generally known as "bridging". In the described embodiment, since the pallets are slided, the bridging of the tire is eliminated, thus stabilizing the shelved tires.

As a result of the swinging of the tilting arms 58a, 58b, the tires stacked in the pallets 52 are turned upright, and the pallets containing tires in upright postures are delivered to the conveyor line 57, thus completing the shelving operation.

The vacant pallets 52 which are to be loaded with the stacks of tires T are conveyed by the conveyor line 57 from the direction opposite to the direction in which the pallets 52 with the shelved tires are conveyed by the same conveyor line 57. The vacant pallets, upon arriving at the position where the pallet tilting portion 58 is provided, are turned sideways by the action of the pallet tilting portion 58 so as to be set aside the tire receiving conveyor 53. In this state, the vacant pallets are ready for receiving the stacks of tires T which have been conveyed by the tire receiving conveyor 53. Then, the shelving operation explained before is commenced so that the shelved pallets 52 are forwarded by the same process as that explained before.

The constructions of the pushing portion, automatic centering portion, flotating portion, pallet tilting portion and the pallet slide portions have been described only by way of example. Thus, the tire shelving device of the invention can have any suitable construction, provided that it has a pushing portion for forcibly pushing stacks of tires into frame pallets, automatic centering portion provided on the pushing portion and capable of automatically centering the stacks of tires while the pushing portion pushes the stacks of tires, a flotating portion which causes the stacks of tires to slightly float above the surface of the tire receiving conveyor during the pushing so as to allow the stacks of tires to freely move in any direction, a pallet tilting portion capable of performing 90° tilting motion of the pallets loaded with the stacks of tires so as to place the pallets on the conveyor line, and a pallet sliding portion which causes the pallets on the conveyor line to slide thereby eliminating any tendency of bridging of tires in the pallets.

The following advantages are brought about by the tire shelving device described hereinbefore.

(1) Stacks of tires on the tire receiving conveyor can be automatically shelved into the frame pallets simply by being pushed by the pushing portion. Since the shelving can be conducted by a mere pushing action, it is possible to shelve the tires fully automatically without requiring any complicated shelving apparatus.

The automatic centering portion on the end of each pushing rod of the pushing portion serves to automatically center the stacks of tires with respect to the storage position in the pallets, so that the stacks of tires are correctly set in the designated storage position in the pallet. This automatic centering effect is achieved by mere pushing action of the pushing rods, without necessitating any specific separate centering means.

This centering operation of the automatic centering portion can be conducted smoothly by virtue of the floating portion which causes the stacks of the tires to float slightly above the surface of the tire receiving conveyor so as to be able to move freely in any direction.

(2) When the pallets loaded with the stacks of tires are turned upright by the action of the pallet tilting portion so as to be placed on the conveyor line, the pallets are slided by the pallet sliding portion. This in turn causes the tires in the pallets to be shaken so that they are loosened, thus eliminating the lack of stability due to bridging which is attributable to the pressure applied to the tires when the tires are held in stacked condition.

What is claimed is:

1. A tire handling system having an automatic tire sorting device, a tire stacking device for stacking tires, an automatic tire supplying device for automatically supplying said tire stacking device with the tires sorted by said tire sorting device, and a tire shelving device for receiving the stacks of tires and placing said stacks of tires in frame pallets, wherein said tire shelving device includes:

a tire receiving conveyor for conveying said stacks of tires to a predetermined location;

a conveyor line installed in the vicinity of said predetermined location and extending in the direction transverse to said tire receiving conveyor, said conveyor line being adapted to convey said frame pallet;

tilting means for carrying said pallets and capable of performing a 90° tilting motion between a first position at which said pallets are laid aside said predetermined location and a second position adjacent to said first position and where said pallets stand upright on said conveyor line;

pushing means disposed to oppose said pallets in said first position across said tire receiving conveyor and for engagement with the stack of tires on said tire receiving conveyor for pushing said stacks of tires into said pallets in said first position; and automatic centering means on the portion of said pushing means engageable with said stacks of tires for centering said stacks of tires with respect to the central axis of said pushing means;

said pushing means including at least one pushing rod for projection and retraction across the space above said tire receiving conveyor by the action of a driving device, said automatic centering means being provided on the end of said pushing rod and including a pair of tire contacting rollers which are disposed on a horizontal line perpendicular to the axis of said pushing rod on both sides of said axis at an equal distance from said axis, said tire contacting rollers being rotatable about respective vertical axes and contacting and centering said tires with respect to said pushing rod as said stacked tires are moved by said pushing rod.

2. A tire handling system according to claim 1, wherein said tire shelving device further includes tire floating means having a multiplicity of free balls disposed at suitable positions on said tire receiving conveyor and arranged so as to be moved up and down by a small distance.

3. A tire handling system according to claim 1, wherein said tire shelving device further includes tire sliding means adapted to engage with said frame pallets held upright on said conveyor line and capable of sliding said pallets in the breadthwise direction of said conveyor line within the breadth of said conveyor line.

4. A tire handling system according to claim 1, wherein said tire shelving device further includes tire floating means having a multiplicity of free balls disposed at suitable positions on said tire receiving conveyor and arranged so as to be moved up and down by a small distance, and sliding means adapted to engage with said frame pallets held upright on said conveyor line and capable of sliding said pallets in the breadthwise direction of said conveyor line within the breadth of said conveyor line.

5. A tire handling system according to claim 1, wherein said tire supplying device includes a conveyor line arranged along a slant plane descending towards the tire stacking device, stopper means disposed on the end of said conveyor line adjacent to said tire stacking device and having a height suitable for stopping a tire which is being conveyed by said conveyor line, and a movable conveyor forming a portion of said conveyor line adjacent to said tire stacking device, said movable conveyor having a length large enough to carry a tire thereon and movable between an upper position and a lower position with its one end moving along said stopper means, said movable conveyor, when in said lower position, has said one end placed at a level below the upper end of said stopper means and the other end placed on said conveyor line so as to enable said stopper means to stop a tire conveyed by said conveyor line and, when in said upper position, has said one end placed at a level above said upper end of said stopper means so as to allow said tire to move over said upper end of said stopper means, while the other end is positioned above said conveyor line so as to stop a succeeding tire.

6. A tire handling system according to claim 5, wherein said stopper means includes a pair of bars which are positioned on both sides of the neutral axis of said movable conveyor on a horizontal line perpendicular to said neutral axis at an equal distance from said neutral axis, whereby said tires on said movable conveyor are automatically centered by said bars.

7. A tire handling system according to claim 1 further having an automatic tire inverting device for automatically and selectively inverting a series of tires which have been turned sideways so as to be supplied one by one to said tire stacking device, said tire inverting device including a casing of a size large enough to receive a tire and disposed along said conveyor line which descends towards said tire stacking device, said casing having an entrance and an exit which open on said conveyor line and sizes large enough to enable said tire to pass therethrough, an opening and closing means for selectively opening and closing said exit, and inverting means for turning said casing upside down through 180° such that said entrance and said exit are reversed.

8. A tire handling system according to claim 7, wherein said opening and closing means includes a pair of parallel stopper bars extending perpendicularly to the bottom of said casing and movable towards and away from each other, said stopper bars being disposed in a plane perpendicular to the neutral axis of said casing at an equal distance from said neutral axis, so that the tire engaged and stopped by said stopper bars is automatically centered by said stopper bars.

* * * * *